United States Patent
Staal et al.

(10) Patent No.: US 11,400,657 B2
(45) Date of Patent: Aug. 2, 2022

(54) METHODS OF FABRICATION OF COMPOSITE REPAIR PARTS AND RELATED KITS

(71) Applicant: The Boeing Company, Chicago, IL (US)

(72) Inventors: Remmelt Andrew Staal, Shoreline, WA (US); Gregory Jonathon Smith, Renton, WA (US); Arne Kenneth Lewis, Auburn, WA (US); Blake Anthony Bertrand, Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 812 days.

(21) Appl. No.: 15/722,342

(22) Filed: Oct. 2, 2017

(65) Prior Publication Data
US 2019/0099959 A1 Apr. 4, 2019

(51) Int. Cl.
*B29C 65/48* (2006.01)
*B29C 65/56* (2006.01)
(Continued)

(52) U.S. Cl.
CPC ........ *B29C 65/4835* (2013.01); *B29C 65/561* (2013.01); *B29C 70/342* (2013.01);
(Continued)

(58) Field of Classification Search
None
See application file for complete search history.

(56) References Cited

U.S. PATENT DOCUMENTS 5,269,861 A * 12/1993 Gilbreath ............ E04G 23/0203
156/98
5,958,166 A 9/1999 Walters et al.
(Continued)

FOREIGN PATENT DOCUMENTS

WO  WO 2016/118449  7/2016
WO  WO 2016/137565  9/2016

OTHER PUBLICATIONS

Lowe's Home Improvement, "How to Repair Drywall", https://www.youtube.com/watch?v=Fdy9uRvpl-E, accessed on Oct. 23, 2020, posted on Mar. 23, 2015 (Year: 2015).*
(Continued)

*Primary Examiner* — Jacob T Minskey
*Assistant Examiner* — Caroline Beha
(74) *Attorney, Agent, or Firm* — Dascenzo Gates Intellectual Property Law, P.C.

(57) ABSTRACT

Composite laminates fabricated from one or more respective laminae of composite material (e.g., fiber-reinforced polymers) may be pre-formed and fully cured, yet configured to be selectively conformable to a desired radius of curvature. To repair a damaged composite structure, a plurality of such composite laminates may be bonded together to form a repair part that may be bolted to or otherwise secured to the damaged composite structure, thereby repairing the structure using repair parts that may match the parent material of the damaged composite structure. Methods of forming said repair parts from a plurality of such composite laminates may provide advantages in costs and lead time, over conventional techniques. Kits may include a plurality of such pre-formed and cured composite laminates that may be stacked and combined together in a plurality of different arrangements to create a customizable repair part for a given damaged composite structure.

17 Claims, 11 Drawing Sheets

(51) Int. Cl.
  *B29C 73/10* (2006.01)
  *B29C 70/84* (2006.01)
  *B29C 70/44* (2006.01)
  *B64F 5/40* (2017.01)
  *B32B 7/04* (2019.01)
  *B32B 5/26* (2006.01)
  *B29C 70/34* (2006.01)
  *B29L 31/30* (2006.01)

(52) U.S. Cl.
  CPC .............. *B29C 70/44* (2013.01); *B29C 70/84* (2013.01); *B29C 73/10* (2013.01); *B32B 5/26* (2013.01); *B32B 7/04* (2013.01); *B64F 5/40* (2017.01); *B29L 2031/3076* (2013.01)

(56) References Cited

U.S. PATENT DOCUMENTS

| | | | | |
|---|---|---|---|---|
| 7,870,005 | B2* | 1/2011 | Arbogast | G06Q 10/06 |
| | | | | 705/2 |
| 8,617,694 | B1* | 12/2013 | Dan-Jumbo | B29C 73/10 |
| | | | | 428/212 |
| 2010/0233424 | A1 | 9/2010 | Dan-Jumbo et al. | |
| 2013/0294644 | A1 | 11/2013 | Cork et al. | |
| 2014/0017037 | A1* | 1/2014 | Plokker | B29C 65/601 |
| | | | | 411/501 |
| 2014/0119813 | A1 | 5/2014 | Moselage, III | |
| 2014/0295124 | A1* | 10/2014 | Suhara | B29C 73/10 |
| | | | | 428/63 |
| 2015/0099411 | A1* | 4/2015 | Yang | B32B 27/12 |
| | | | | 442/1 |
| 2015/0251401 | A1* | 9/2015 | Ackerman | B32B 37/12 |
| | | | | 156/92 |
| 2016/0159057 | A1 | 6/2016 | Butler | |
| 2017/0008184 | A1* | 1/2017 | Tomblin | B26D 5/007 |
| 2018/0036973 | A1* | 2/2018 | Dew | B29C 73/10 |
| 2018/0094525 | A1* | 4/2018 | Roberts | F01D 5/005 |

OTHER PUBLICATIONS

European Patent Office, Extended European Search Report for related European Applicatio No. 18/193,985, dated Feb. 27, 2019.

U.S. Appl. No. 15/646,606, filed Jul. 11, 2017, Bertrand et al..

* cited by examiner

METHODS OF FABRICATION OF COMPOSITE REPAIR PARTS AND RELATED KITS

FIELD

The present disclosure relates to methods and kits for fabrication of composite repair parts.

BACKGROUND

Damage to structures, such as structures formed of fiber-reinforced polymer composites (which may be referred to herein simply as "composites," or "composite materials") may be repaired by repair parts that are secured to the structure, such as by bolts or other fasteners, adhesives, and/or curing the repair part directly on the damaged structure. For example, aircraft may be damaged by events such as lightning strikes, or from collisions (e.g., with carts or other vehicles moving about the aircraft, ground debris, hail stones, birds, etc.) thus requiring one or more repair parts to fix the damage. Repair parts may be bolted to the damaged structure, which advantageously may be straightforward to install, with predictable load transfer capability. Furthermore, bolting the repair parts to the damaged structure may eliminate the risk of thermal damage to the damaged structure (e.g., aircraft), which may occur if the repair part is cured onto the damaged structure (e.g., the damaged structure is essentially used as a tooling surface). Such repair parts have been formed of metallic materials, as well as composite materials.

Metallic repair parts may be less preferred because they may be required to be oversized and/or stiffer than needed, due to fatigue and damage tolerance issues. Metallic repair parts also may require extra inspections after installation, which may be time-consuming and/or subjective, based on the technician. Furthermore, metallic repair parts are formed of materials that are different from the parent material when used for repairs on composite aircraft (or other composite structures), and may be difficult to form into complex curvature/shapes with multiple contours and/or tight radii, as may be needed for a given repair. For these reasons, airlines often request composite repair parts when damage occurs.

Conventional composite repair parts, however, are generally stiff and not formable, which can increase the difficulty of their use in the field. Composite repair parts generally must be specifically tailored for a given damaged location for a given structure (e.g., aircraft), and thus it often is not practical or cost-effective to stock composite repair parts, due to the large number of different parts that may be needed, and numerous variables that may affect the specifications for the repair part. However, because such composite repair parts may take two days or more to fabricate, lead times are increased in such repairs. Furthermore, tooling costs associated with fabricating the customized repair parts may increase the costs of composite repair parts as compared to metallic repair parts.

SUMMARY

Presently disclosed composite repair parts may be fabricated more quickly than conventional composite repair parts, may be customizable to a particular need, and may be configured for repairs on damaged composite structures, such as aircraft. Composite repair parts according to the present disclosure may be assembled from a plurality of pre-formed, pre-cured composite laminates that may be stacked together in various orientations and configurations to create customizable parts for repairing composite structures. Methods of fabricating such composite repair parts, methods of repairing a damaged composite structure using such composite repair parts, aircraft including said composite repair parts, and kits including said composite repair parts are also disclosed.

One example of a repair part configured to repair a damaged composite structure includes a first composite laminate, a second composite laminate, and a third composite laminate, with a first adhesive positioned between and bonding the first composite laminate and the second composite laminate, and a second adhesive positioned between and bonding the second composite laminate and the third composite laminate. Each respective composite laminate is formed of one or more respective lamina(e) of fully cured fiber-reinforced composite material. The first adhesive and second adhesive may be configured to be cured at a first temperature that is lower than a second temperature at which the composite laminates were cured. The repair part may be configured to be bolted and/or bonded to the damaged composite structure in order to repair said damaged composite structure.

One example of a method according to the present disclosure generally includes forming a first composite laminate, forming a second composite laminate, and providing instructions for assembling the first composite laminate together with the second composite laminate to form a repair part configured to repair the damaged composite structure. The respective composite laminates are formed of one or more lamina(e) of fully cured fiber-reinforced composite material and are flexible such that they are selectively conformable to a desired radius of curvature. The providing instructions for assembling the composite laminates together generally includes instructing the use of an adhesive between the composite laminates, wherein the adhesive is configured to bond the composite laminates together when the adhesive is cured.

DESCRIPTION

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
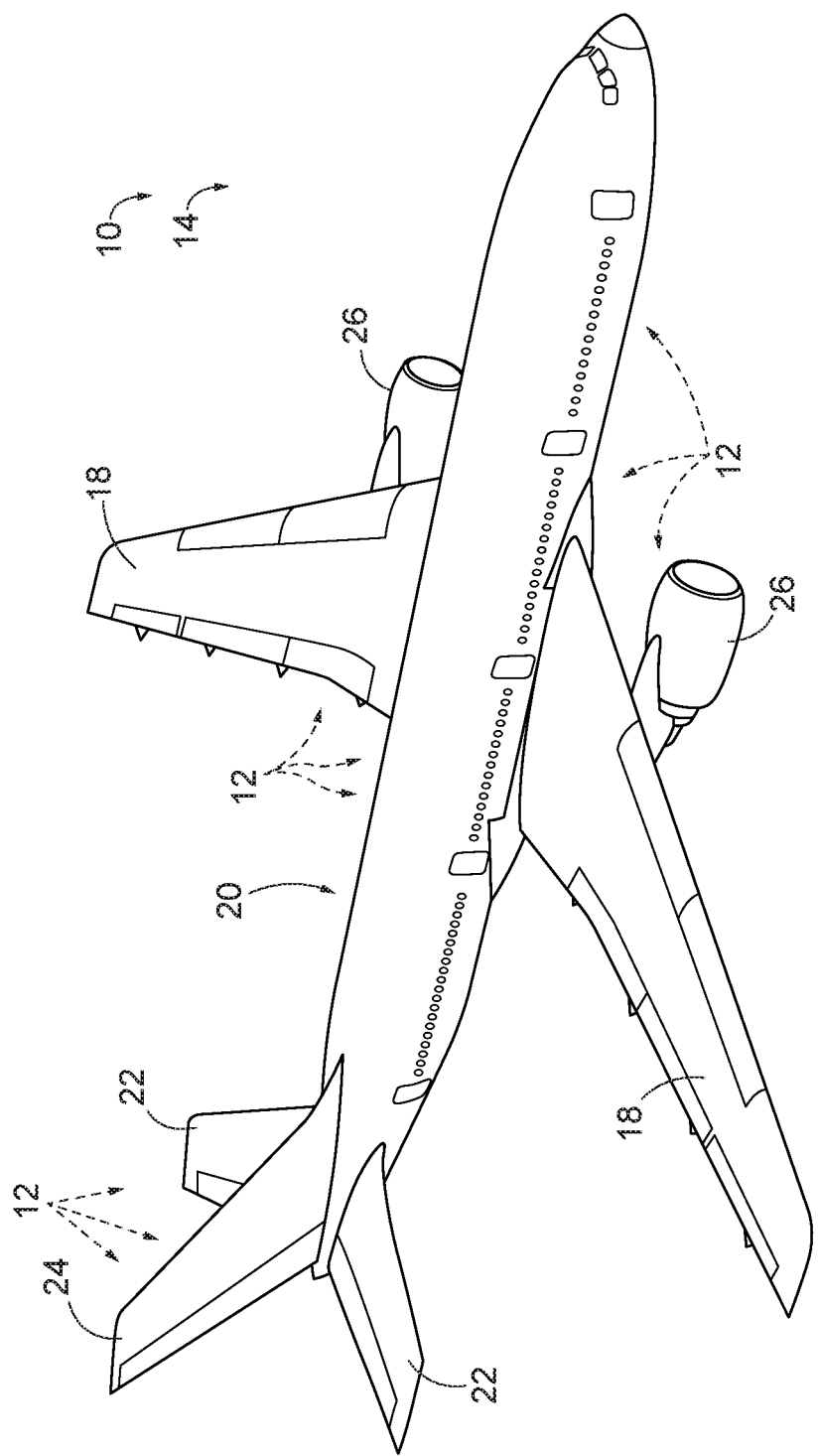
FIG. 1 is a perspective, schematic view of illustrative, non-exclusive examples of an apparatus that may include one or more composite repair parts according to the present disclosure.

FIG. 1 illustrates an example of an apparatus 10 that may include one or more composite structures 12, also referred to herein as composite parts 12. Apparatus 10 is illustrated in the form of an aircraft 14, though apparatus 10 is not limited to aircraft. In examples where apparatus 10 is an aircraft 14, aircraft 14 may take any suitable form, including commercial aircraft, military aircraft, or any other suitable aircraft. While FIG. 1 illustrates an aircraft 14 in the form of a fixed wing aircraft, other types and configurations of aircraft are within the scope of aircraft 14 according to the present disclosure, including (but not limited to) rotorcraft and helicopters. Furthermore, apparatus 10 may be any type of vehicle, structure, or other apparatus, and composite structure 12 may be any structure formed of one or more layers of composite materials.

Apparatus 10 (e.g., aircraft 14) may include one or more composite structures 12, which may be formed from one or more layers of fiber-reinforced polymers (e.g., carbon fiber-reinforced polymers) and/or from one or more sandwich panels (e.g., honeycomb panels), one or more of which may be composite panels. Each sandwich panel generally includes a core formed of a relatively lightweight material, sandwiched between two panel skins. Composite structures 12 may include one or more coatings or layers applied to the underlying panels or layers of material. Composite structures 12 may include one or more sandwich panels, joints formed between two or more sandwich panels, and/or three-dimensional structures formed using one or more sandwich panels. Composite structures 12 may have complex shapes, contours, and/or curves, and may include tight radii of curvature.

As illustrative, non-exclusive examples, composite structures 12 may be utilized in such aircraft structures as wings 18, fuselages 20, horizontal stabilizers 22, vertical stabilizers 24, and engine housings 26; however, other components of aircraft 14 additionally or alternatively may include composite structures 12, which may include sandwich panels and/or joints formed between two or more sandwich panels. Other applications in aircraft 14 for composite structures 12 may include overhead storage bins, floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, apparatus 10 (including one or more composite structures 12) may include or be a portion of space satellites or aerospace vehicles, transit vehicles, shipping containers, shelters, large antennae or disk reflectors, refrigeration panels, rapid transit floor panels, shipboard electronic deck shelters, cargo pallets, automobile bodies, boats and other marine vehicles, architectural curtain walls, partitions, divider panels, expandable hospital shelters, and/or interior structures of an assembly.

Figure 2:
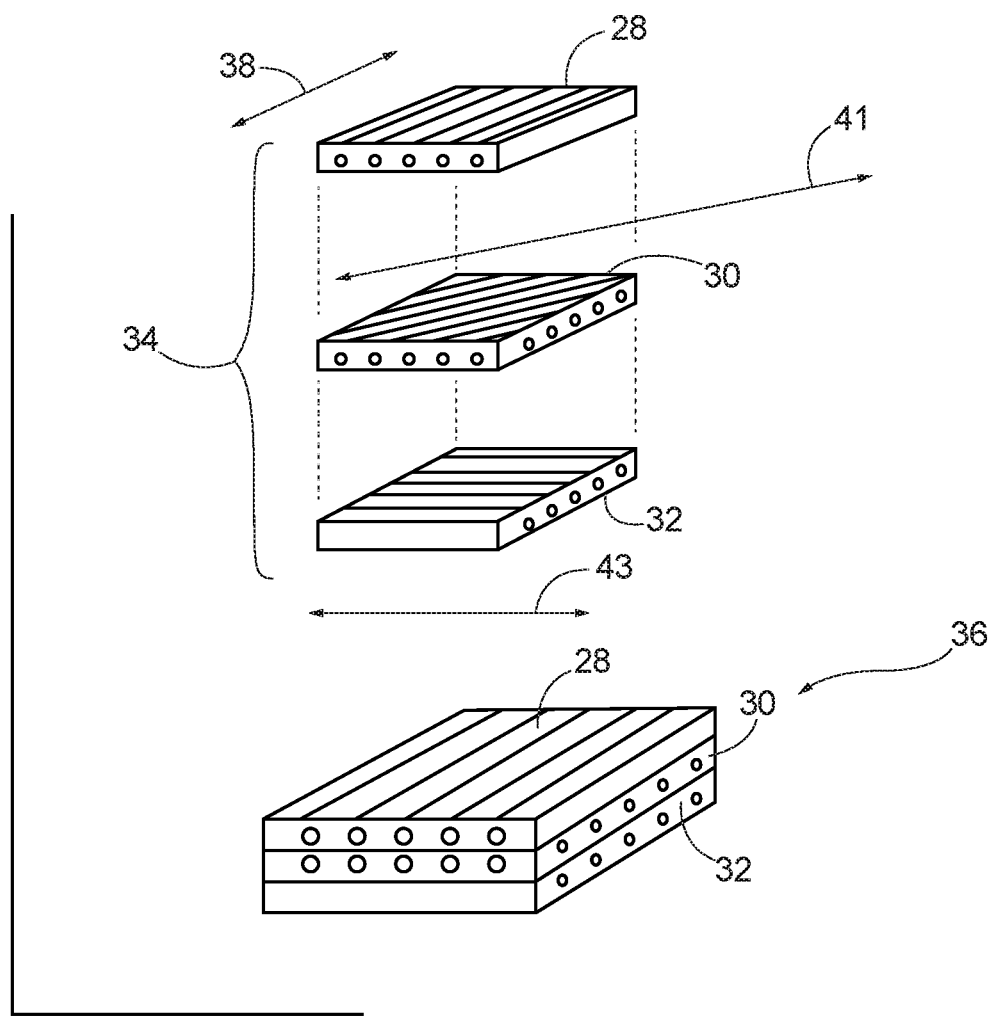
FIG. 2 is an exploded, schematic representation of non-exclusive examples of composite laminates according to the present disclosure.

Composite structures 12 are generally formed, or fabricated, by a plurality of layers, or laminae that are stacked and arranged with respect to one another, and then cured (e.g., solidified in a polymer matrix). For example, FIG. 2 illustrates a first lamina 28, a second lamina 30, and a third lamina 32 (together, laminae 34) that may be stacked and assembled to form composite laminate 36 (also referred to herein as "laminate 36"). As used herein, the term "laminate" refers to one or more lamina of composite materials (e.g., fiber-reinforced polymer materials) that has been fully cured. As used herein, the term "fully cured" means that the material has been impregnated, coated, and/or saturated with a resin or other polymer or adhesive that has at least substantially fully polymerized or hardened such that it has changed from a liquid to a solid state. Suitable materials for composite structures 12 may include carbon fibers, aramid fibers, glass fibers, boron fibers, quartz fibers, basalt fibers, ceramic fibers, Zylon Poly-p-Phenylene Benzobisoxazole (PBO) fibers, natural fibers (e.g., abaca, coconut, flax, hemp, jute, kenaf, sisal, etc.), thermoset materials, thermoplastic materials, polyester resins, epoxy resins, vinylester resins, phenolic resins, and/or gel coat materials.

As schematically illustrated in FIG. 2, each respective lamina 28, 30, 32 may have a particular fiber orientation and/or weave arrangement in some examples. First lamina 28 is shown in a first orientation having a first fiber direction (indicated by arrow 38), second lamina 30 is shown in a second orientation having a second fiber direction (indicated by arrow 41), and third lamina 32 is shown in a third orientation having a third fiber direction (indicated by arrow 43). While each of the first fiber direction, the second fiber direction, and the third fiber direction are indicated as being different from one another in FIG. 2, in other examples of laminates 36, laminae 34 may be arranged in different manners. For example, respective laminae 34 may be arranged in alternating orientations in some examples. In some examples, respective laminae 34 may be arranged such that one or more adjacent laminae 34 are oriented in substantially the same fiber direction. In other examples, respective laminae 34 may be arranged in other orders and orientations than is illustrated for explanation purposes in FIG. 2. Laminates 36 may be customized by varying and/or selecting desired properties and orientations for each lamina and/or the order in which laminae 34 are stacked. Each lamina may have a different thickness, fiber orientation angle, fiber material, and/or matrix material in some examples. In some examples, the fiber direction of each respective lamina can vary in any direction, and/or laminate 36 may be a non-traditional laminate.

Additionally, laminate 36 may include more or fewer laminae 34. In some examples, laminate 36 may include just a single lamina (e.g., first lamina 28, second lamina 30, or third lamina 32). In some examples, laminate 36 may include a plurality of laminae 34 (e.g., one or more of first lamina 28, one or more of second lamina 30, and/or one or more of third lamina 32). As will be explained in further detail below, laminate 36 may be assembled together with one or more additional laminates according to the present disclosure, to form a repair part for a damaged composite structure, the repair part being configured to restore the original strength and stiffness of the damaged composite structure, thereby repairing damage to one or more composite structures (e.g., one or more composite structures 12 of apparatus 10 of FIG. 1).

Figure 3:
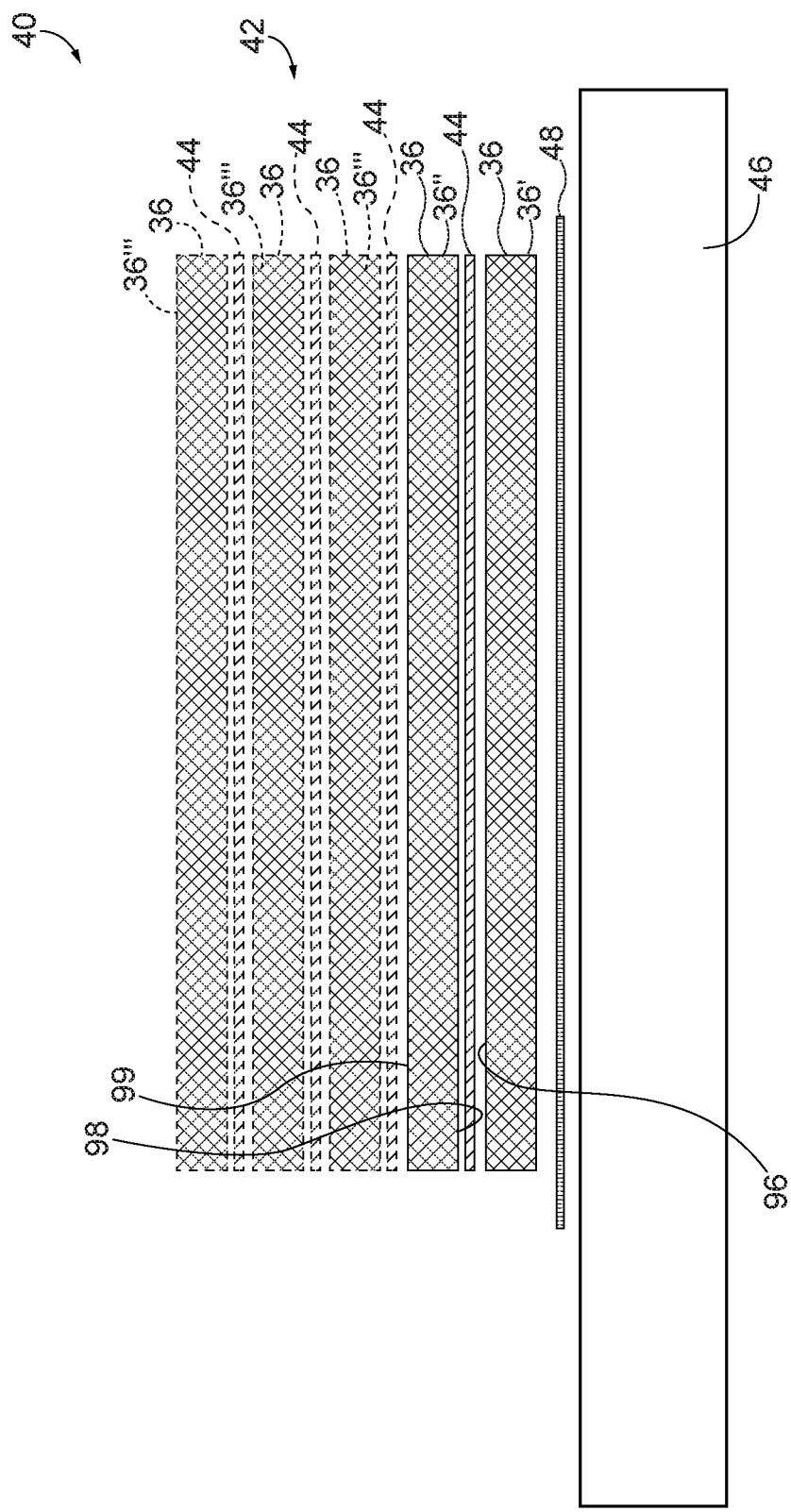
FIG. 3 is an exploded, cross-sectional schematic representation of non-exclusive examples of systems for forming composite repair parts according to the present disclosure.

FIG. 3 schematically illustrates examples of systems 40 for forming a repair part for repairing a damaged composite structure. As shown in FIG. 3, system 40 includes one or more laminates 36 (each respective laminate 36 including one or more respective lamina of fully cured fiber-reinforced composite material, as described in connection with FIG. 2) that are configured to be assembled together to form a stacked assembly 42. For example, stacked assembly 42 includes first composite laminate 36' and second composite laminate 36", and may include one or more additional composite laminates 36'". Each respective laminate 36 may be formed from any number of respective laminae. In some examples, each respective laminate 36 in a given stacked assembly 42 may be formed of the same number of respective laminae. In some examples, one or more respective laminates 36 in a given stacked assembly 42 may be formed from a different number of respective laminae than one or more other respective laminates 36 in the given stacked assembly 42. For example, one respective laminate 36 in a given stacked assembly 42 may be thicker (e.g., formed from a higher number of respective laminae) than a second respective laminate 36 in the given stacked assembly 42, in some examples. In some examples, a respective composite laminate 36 may be used as localized reinforcement for a second respective composite laminate 36.

Each respective laminate 36 is configured to be at least semi-flexible. For example, each respective laminate 36 may be selectively conformable, such as conformable to a desired radius of curvature. In some examples, each respective laminate 36 may be selectively conformable to a radius of curvature of about 15 in (38 cm) or less. In this manner, laminates 36 may more readily selectively conformed to the composite structure in need of repair. Laminates 36 may be shaped complementarily to each other such that they are configured to be stacked and nested together to form stacked assembly 42. In some examples, laminates 36 may be fabricated and cured into a contoured (e.g., three-dimensional) shape, such as the 'hat-shaped' repair part 50 shown in FIG. 4, and yet still retain flexibility to conform to a given damaged composite structure. In some examples, laminates 36 may be fabricated into substantially flat panels or strips, and then selectively shaped to conform to the damaged composite structure at the time of use.

An adhesive 44 is applied or positioned in between each adjacent pair of laminates 36 (e.g., in between first laminate 36' and second laminate 36" and/or in between second laminate 36" and additional laminate 36'" and/or in between adjacent additional laminates 36'"). FIG. 3 illustrates the respective laminates 36, adhesives 44, and other system components as spaced apart from one another (e.g., exploded), for clarity, though when stacked (e.g., into stacked assembly 42), adjacent respective laminates 36 and adhesives 44 may be in contact with one another and/or compressed together. Once so assembled, adhesives 44 may be cured, such that adjacent laminates 36 are bonded together to form a repair part (e.g., repair part 50 of FIG. 4) that may be used, for example, to repair a damaged composite structure. As used herein, the part is referred to as "stacked assembly 42" prior to curing of adhesives 44, and stacked assembly 42 is referred to as a "repair part" once adhesives 44 are cured and laminates 36 are bonded together. While laminates 36 are generally described herein as being used to form repair parts for repairing structures, in some examples, laminates 36 may be assembled as described to form general parts that are not necessarily configured to repair damage. For example, laminates 36 may be used to reinforce existing structures, and/or to form selectively customizable composite parts in general.

In some systems 40, stacked assembly 42 may be positioned on a tooling, or tooling surface 46. Tooling surface 46 may define a desired contour for the resulting repair part, such that stacked assembly 42 is urged towards the desired contour as adhesives 44 are cured and laminates 36 are bonded together, thereby forming the repair part in the desired contour. In some examples, a release film 48 is positioned between stacked assembly 42 and tooling surface 46, with release film 48 being configured to facilitate release of the resulting repair part from tooling surface 46 after curing of adhesives 44. For example, release film 48 may be configured to prevent or reduce adhesion of stacked assembly 42 to tooling surface 46.

Composite laminates 36 may be fabricated in advance, and combined and assembled in customized assemblies, thereby providing repair parts 50 more quickly than conventional repair parts, in some examples. Repair parts 50 according to the present disclosure are configured to substantially restore a damaged composite structure to its original strength, performance, and stiffness (e.g., its strength, performance, and stiffness before becoming damaged). Such repair parts 50 may advantageously allow for simple installation on the damaged composite structure, and also may be configured for strength and stiffness matching with the parent material of the damaged composite structure. Repair parts 50 may be coupled to the damaged composite structure, such as by being fastened to the damaged composite structure (e.g., using bolts or other fasteners) and/or by being adhered or bonded to the damaged composite structure. In some examples, repair part 50 is coupled to the damaged composite structure after composite laminates 36 are bonded together to form repair part 50. In some examples, repair part 50 may be coupled to the damaged composite structure in conjunction with curing adhesives 44 of stacked assembly 42, thereby forming repair part 50 while it is being coupled to the damaged composite structure.

In some examples, presently disclosed composite laminates 36 may be used modularly to create a plurality of different and unique parts, where it may not otherwise be practical to fabricate each and every possibility for the resulting repair part. In this manner, presently disclosed composite laminates 36 and associated disclosed methods may streamline the fabrication process for composite repair parts, allowing for shorter lead times to repair parts, while maintaining the ability to customize the repair parts for a given damaged composite structure. Lead times for implementation of the repair may be even further improved, in some examples, with parallel engineering practices, such as, for example, determining an appropriate stacking sequence for assembling composite laminates 36 while the composite laminates are being provided or transported to (e.g., shipped to) the location of the damaged composite structure. Additionally, presently disclosed composite laminates 36 may be configured to be stored for a substantial period of time before being assembled into a repair part, at least in part due to being fully cured. The raw fiber materials from which the composite laminates are formed, on the other hand, may have a much more limited shelf life. In some examples, presently disclosed composite laminates 36 and related methods may minimize the risk of thermal damage to the damaged composite structure, as the composite laminates are fully cured before being installed on the damaged composite structure, and adhesives 44 between the fully cured composite laminates 36 may be configured to be cured at a lower temperature than composite laminates 36 are configured to be cured at.

Figure 4:
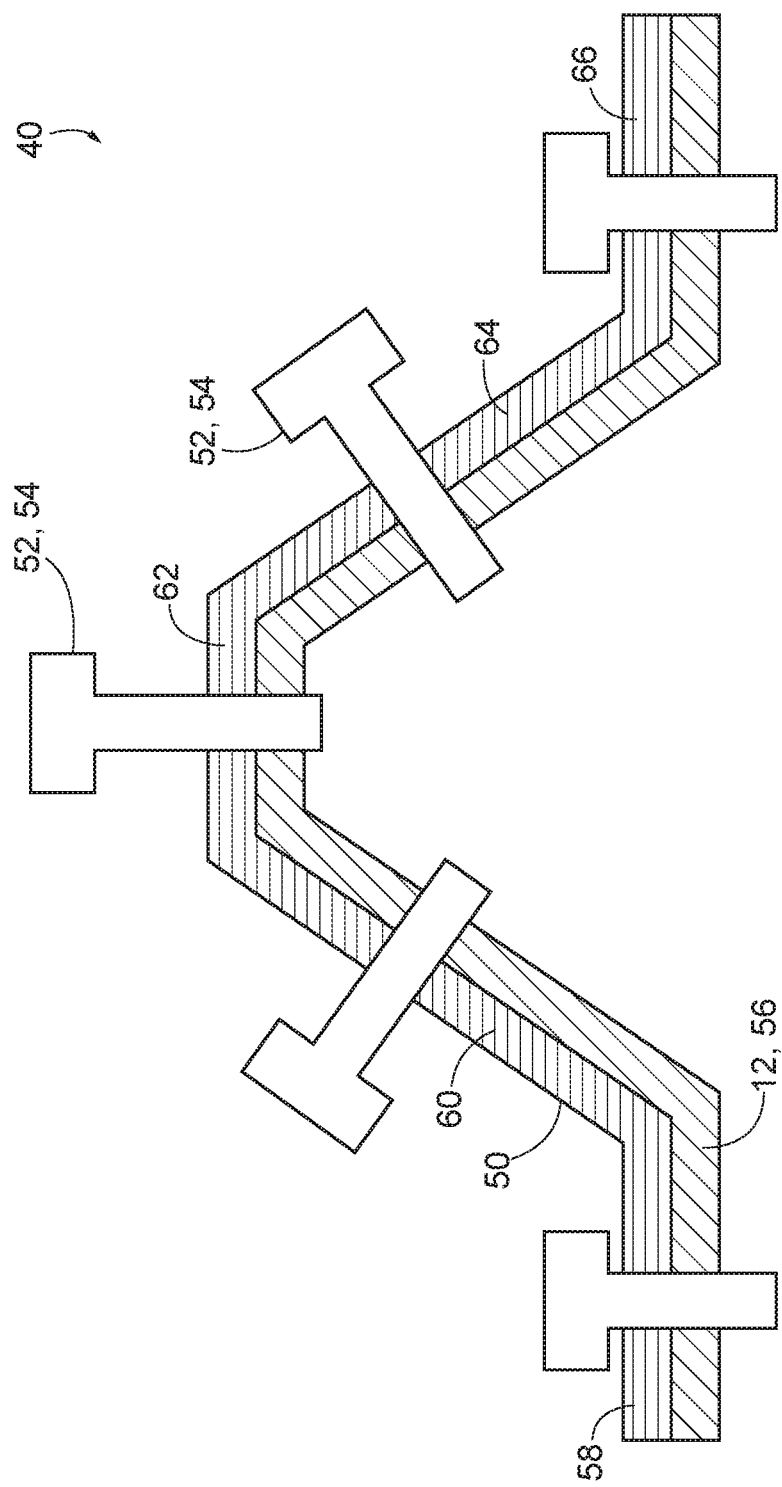
FIG. 4 is a schematic cross-sectional representation of a repair part according to the present disclosure, secured to a damaged composite structure.

FIG. 4 schematically illustrates one example of repair part 50 according to the present disclosure, in place on a damaged composite structure 56 (which is an example of composite structure 12). As shown in FIG. 4, systems 40 may include one or more fasteners 52 configured to secure repair part 50 to damaged composite structure 56, such as one or more bolts 54 (which are examples of fasteners 52). While FIG. 4 illustrates five fasteners 52 securing repair part 50 to damaged composite structure 56, it is to be understood that a plurality of fasteners 52 may be positioned along the length of repair part 50 and damaged composite structure 56. Furthermore, more or fewer fasteners 52 may be used to secure repair part 50 to damaged composite structure 56 across the surface area of repair part 50 than are shown in FIG. 4. Additionally or alternatively, repair part 50 may be bonded or otherwise secured to, installed on, and/or coupled to damaged composite structure 56. Repair part 50 may be secured to damaged composite structure 56 such that repair part 50 replaces a portion of damaged composite structure 56, and/or such that it spans at least part of the damaged portion of damaged composite structure 56. For example, the particular section or sections of damaged composite structure 56 that repair part 50 is secured to may be undamaged in some examples. In some examples, repair part 50 may be secured to damaged composite structure 56 on one or both sides of the damaged section or sections of damaged composite structure 56. In some examples, the damaged section or sections of damaged composite structure 56 may be removed prior to or after repair part 50 is secured to damaged composite structure 56. In some examples, the damaged section or sections of damaged composite structure 56 may remain in place once repair part 50 is secured to damaged composite structure 56.

In the example of FIG. 4, damaged composite structure 56 is shown in the form of a stiffener, such as a stringer, for an aircraft (e.g., aircraft 14 of FIG. 1). In other examples, damaged composite structure 56 may be another portion or component of an aircraft or other structure or vehicle. For example, repair parts 50 may be configured to repair a skin panel, a frame, a shear tie, and/or a fuselage of an aircraft or other vehicle or structure. In some specific examples, repair part 50 may be a splice for a damaged barrel segment, a frame splice part, a stiffener splice, and/or a splice between a repair panel and an aircraft's original fuselage skin. In some examples of systems 40, repair part 50 and damaged composite structure 12 may be formed of the same material. Generally, repair parts 50 according to the present disclosure are formed such that they substantially conform to the damaged composite structure they are configured to repair. In other words, repair parts 50 according to the present disclosure may be customized, or custom-fabricated for a given damaged composite structure. In some examples, repair part 50 is three-dimensionally contoured such that it is complementarily shaped to the damaged composite structure it is configured to repair. Repair part 50 shown in FIG. 4 is three-dimensionally contoured such that it substantially conforms to and is complementarily shaped to damaged composite structure 56.

In some examples, repair part 50 may be a substantially flat or curved panel. In some examples, repair part 50 may be angled, having a first portion arranged at a non-parallel angle with respect to a second portion. For example, the example of repair part 50 shown in FIG. 4 includes a first portion 58, a second portion 60, a third portion 62, a fourth portion 64, and a fifth portion 66, with each adjacent pair of portions being arranged at a non-parallel angle with one another (e.g., first portion 58 and second portion 60 are arranged at a non-parallel angle with respect to one another, second portion 60 and third portion 62 are arranged at a non-parallel angle with respect to one another, third portion 62 and fourth portion 64 are arranged at a non-parallel angle with respect to one another, and fourth portion 64 and fifth portion 66 are arranged at a non-parallel angle with respect to one another). Despite repair part 50 being referred to as having different 'portions,' such references may be for explanation only, such that all the portions 58, 60, 62, 64, 66 may be integrally formed. Such angled portions 58, 60, 62, 64, 66 of repair part 50 may be formed to conform to complementary angled portions of damaged composite structure 56.

Figure 5:
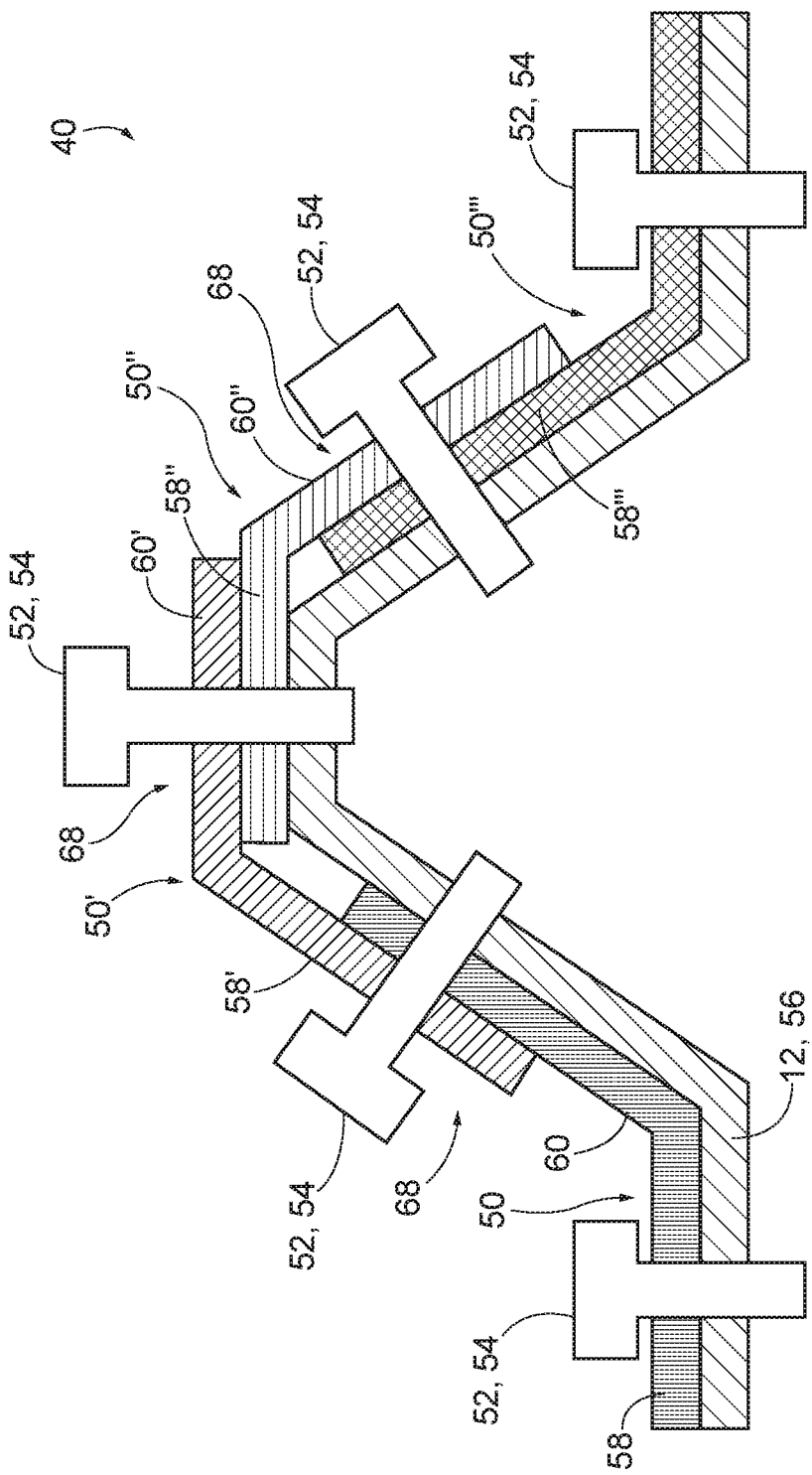
FIG. 5 is a schematic cross-sectional representation of a plurality of repair parts according to the present disclosure, arranged in an overlapping fashion and secured to a damaged composite structure.

FIG. 5 schematically illustrates another example of system 40 having a plurality of repair parts (e.g., first repair part 50, second repair part 50', third repair part 50", and fourth repair part 50''') secured to damaged composite structure 56 via a plurality of bolts 54. In the example shown in FIG. 5, each repair part 50 is an angled repair part, having a respective first portion 58 and a respective second portion 60 arranged at a non-parallel angle to the respective first portion 58. In this example, repair parts 50, 50', 50", and 50''' are selectively combined together to repair damaged composite structure 56. For example, a portion of each respective repair part may be positioned with respect to one or more other respective repair parts such that one or more parts of each respective repair part may overlap one or more parts of one or more other respective repair parts. In FIG. 5, at least a part of first portion 58' of second repair part 50' overlaps at least a part of second portion 60 of first repair part 50, at least a part of second portion 60' of second repair part 50' overlaps at least a part of first portion 58" of third repair part 50", and at least a part of second portion 60" of third repair part 50" overlaps at least a part of first portion 58''' of fourth repair part 50''', thereby forming a plurality of areas of overlap 68. In some examples, and as shown in FIG. 5, at least one respective fastener 52 may be positioned in each respective area of overlap 68.

Turning now to FIGS. 7-11, illustrative non-exclusive examples of repair parts 50 are illustrated. Where appropriate, the reference numerals from the schematic illustrations of FIGS. 2-5 are used to designate corresponding parts in FIGS. 7-11; however, the examples of FIGS. 7-11 are non-exclusive and do not limit repair parts 50 to the illustrated embodiments. That is, repair parts 50 are not limited to the specific embodiments illustrated, and may incorporate any number of the various aspects, configurations, characteristics, properties, etc. of repair parts 50 that are illustrated in and discussed with reference to the schematic representations of FIGS. 2-5 and/or the embodiments of FIGS. 7-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 7-11; however, it is within the scope of the present disclosure that the previously discussed features, variants, etc. may be utilized with these examples.

Figure 6:
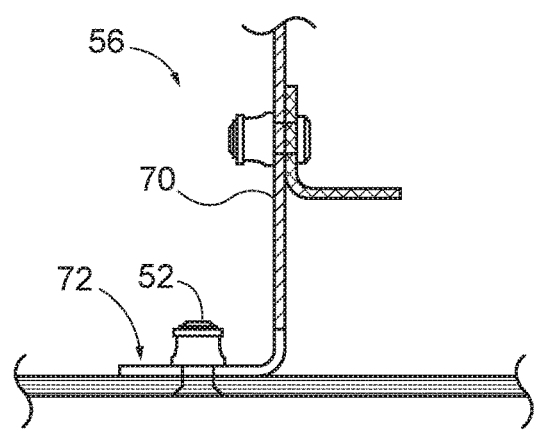
FIG. 6 is a schematic representation of a prior art damaged composite structure.
Figure 7:
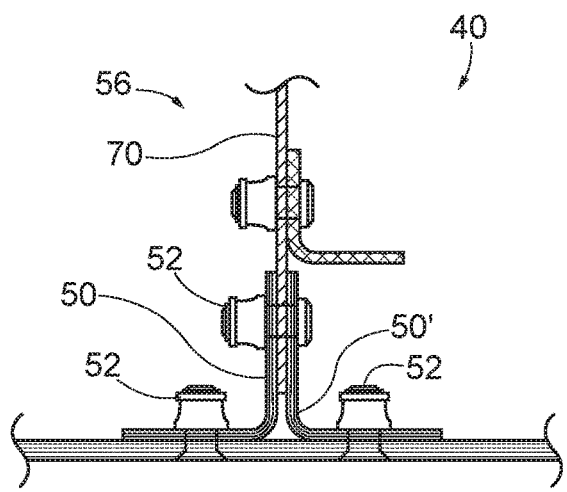
FIG. 7 is a schematic, elevation view representation of a first method of repair of the damaged composite structure of FIG. 6, according to the present disclosure.
Figure 8:
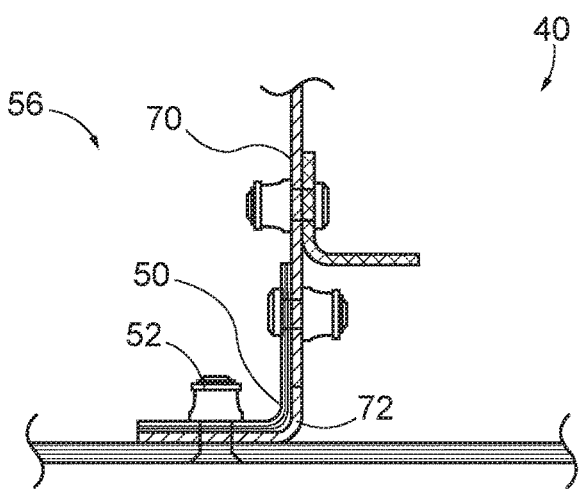
FIG. 8 is a schematic elevation view representation of a second method of repair of the damaged composite structure of FIG. 6, according to the present disclosure.

FIG. 6 illustrates an example of a damaged composite structure 56, in the form of a composite frame 70 having a damaged portion 72. FIGS. 7-8 illustrate two ways of repairing damaged composite structure 56 using one or more repair parts 50 according to the present disclosure, in the form of aerospace components configured to repair a damaged aircraft. In the example shown in FIG. 7, damaged portion 72 has been removed from damaged composite structure 56, and two angled repair parts 50, 50' are secured to damaged composite structure 56 via fasteners 52. In the example shown in FIG. 8, on the other hand, damaged portion 72 remains in place, and repair part 50 overlaps and spans damaged portion 72, thereby repairing damaged composite structure 56. In some examples, fasteners 52 used to secure repair parts 50 may be oriented, positioned, and/or spaced apart to match the orientation, positioning, and/or spacing of the original fasteners used on the structure.

Figure 9:
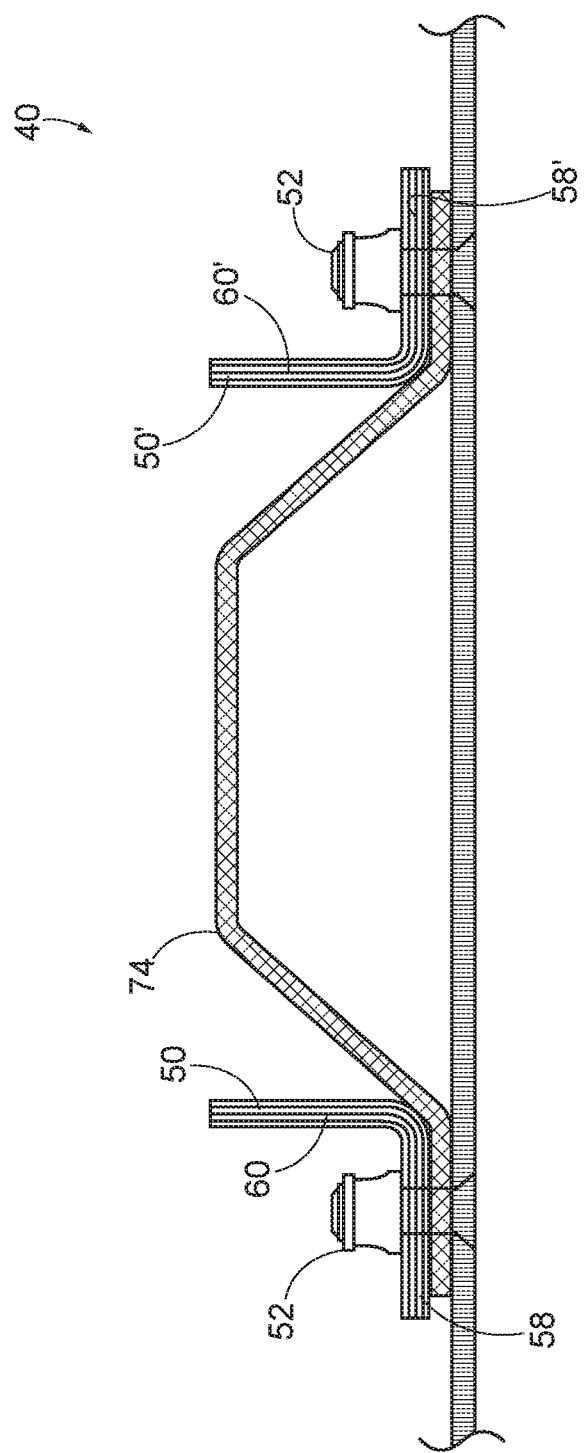
FIG. 9 is a schematic elevation representation of two repair parts according to the present disclosure, secured to a damaged composite structure.

FIG. 9 illustrates an example of a damaged composite structure 56, in the form of a damaged composite stringer 74, repaired with angled repair parts 50, 50' according to the present disclosure. While in many examples, repair part 50 substantially may conform to the damaged composite structure 56 it is configured to repair, as shown in FIG. 9, in some examples, some or all of repair part 50 may not follow the contours of damaged composite structure 56. For example, first portions 58, 58' of respective repair parts 50, 50' conform to damaged composite stringer 74, while second portions 60, 60' of respective repair parts 50, 50' do not.

Figure 10:
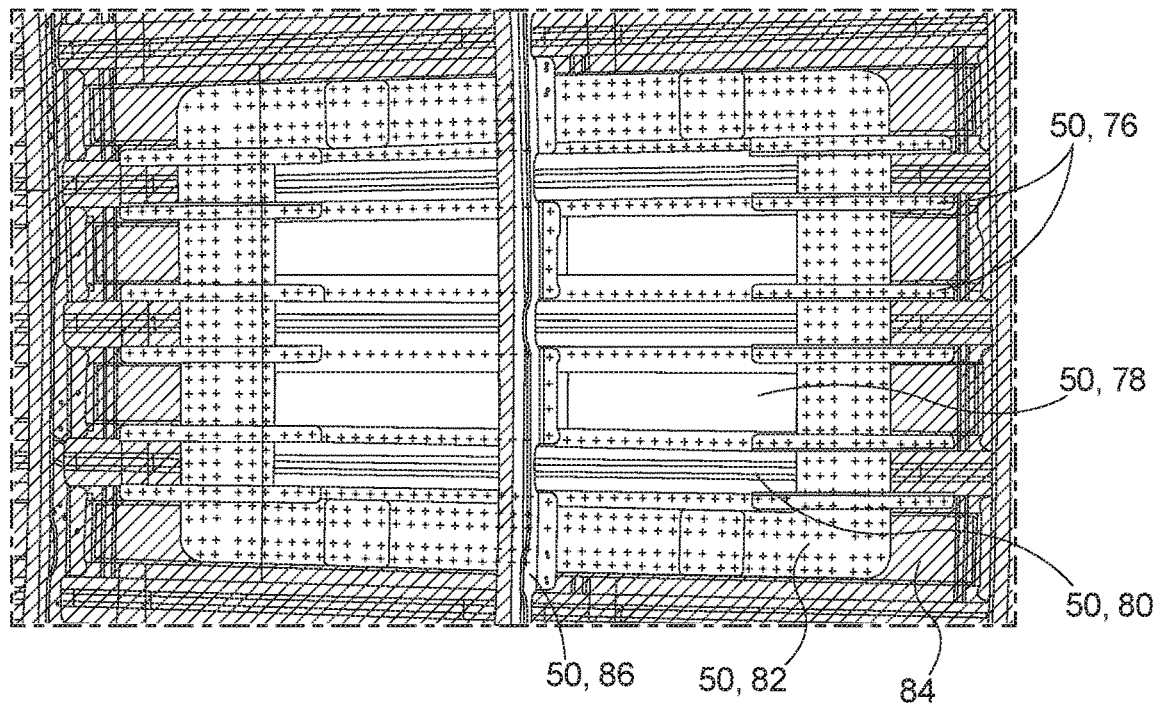
FIG. 10 illustrates examples of repair parts according to the present disclosure, secured to a damaged composite structure.
Figure 11:
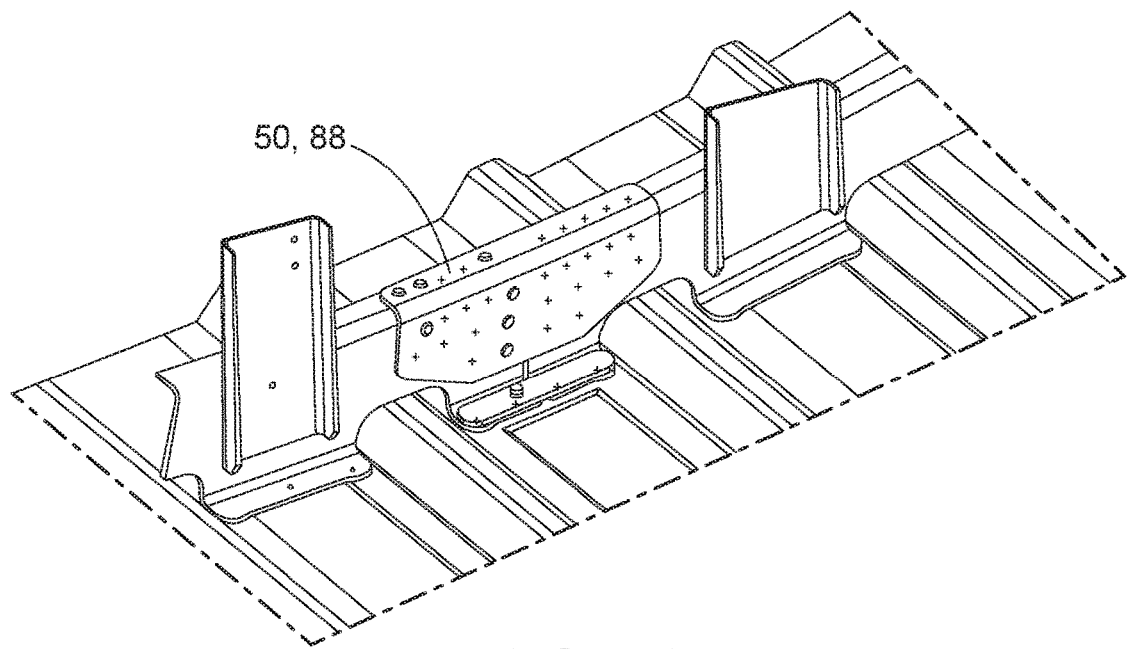
FIG. 11 illustrates another example of a repair part according to the present disclosure, secured to a damaged composite structure.

FIGS. 10-11 illustrate examples of repair parts 50 in place on damaged composite structures 56 that have been repaired by repair parts 50 according to the present disclosure. FIG. 10 illustrates examples of repair parts 50 in the form of a stiffener splice 76, a repair panel 78, a repair stiffener 80, a splice 82 between repair panel 78 and an original fuselage skin 84, and a frame repair part 86 (e.g., a repair shear tie 86). FIG. 11 illustrates an example of repair part 50 in the form of a frame splice 88. As shown, repair parts 50 may be used to repair portions of or entire damaged composite structures 56 and/or act as splices between intact components and/or between a repair part and an original component.

Figure 12:
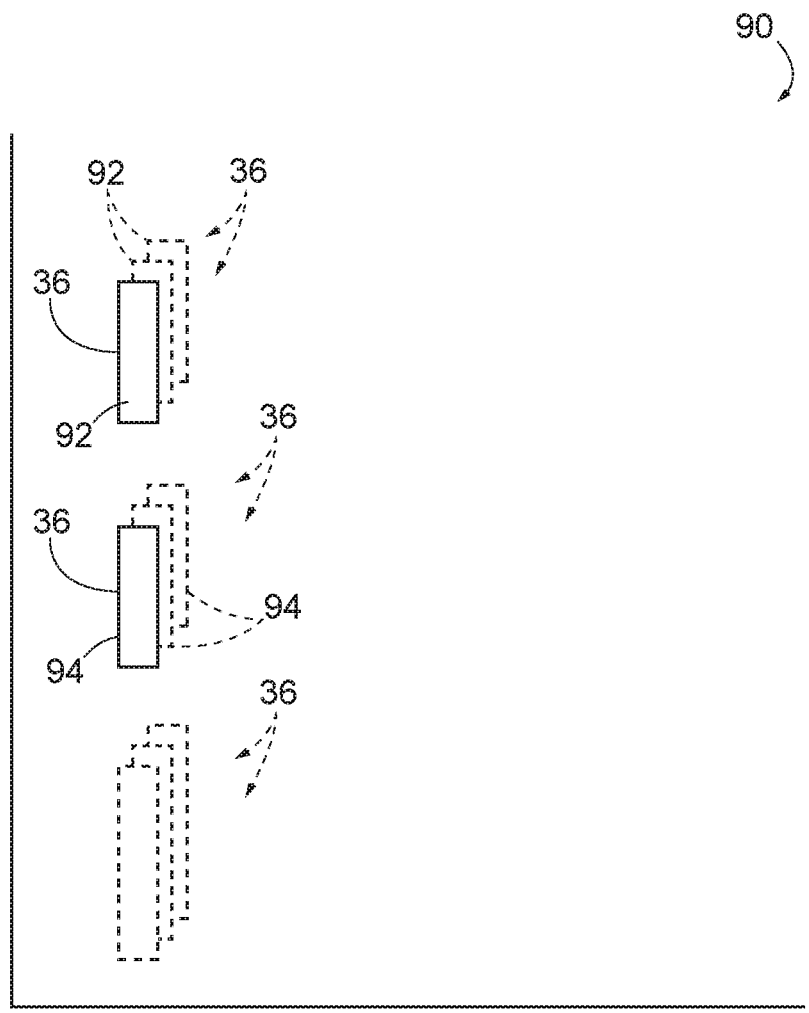
FIG. 12 is a schematic representation of non-exclusive examples of kits according to the present disclosure.

FIG. 12 schematically represents examples of kits 90 according to the present disclosure. Kits 90 include a plurality of composite laminates 36, each composite laminate 36 being formed from one or more respective laminae of fully cured fiber-reinforced composite material. Each composite laminate 36 of kit 90 is at least semi-flexible and may be formed from any suitable number of respective laminae that allows for the desired resulting selective conformability in the resulting composite laminate 36. Individual lamina of each respective composite laminate 36 may be arranged having a substantially similar orientation with one another, or may be arranged having varying orientations within a given respective composite laminate 36.

Kit 90 may include a plurality of different composite laminates 36 in some examples, where at least some of the plurality of composite laminates are different from at least some others of the plurality of composite laminates 36 in one or more of shape, size, fiber direction, and material composition. For example, the plurality of composite laminates 36 may include at least one first composite laminate 92 and at least one second composite laminate 94. In some examples, kit 90 includes a plurality of first composite laminates 92 and a plurality of second composite laminates 94, with first composite laminates 92 being different from second composite laminates 94. For example, each respective first composite laminate 92 may have a different fiber direction, thickness, fiber material, and/or matrix material than each respective second composite laminate 94. Kit 90 may be configured to include each respective composite laminate 36 called for in fabricating a desired repair part. For example, one or more first composite laminates 92 and one or more second composite laminates 94 may be configured to be stacked together to form a stacked assembly (e.g., stacked assembly 42) and bonded together to form a repair part having the desired strength characteristics, shape and contour, and material properties for the given repair.

Kit 90 may be configured to include a plurality of different composite laminates 36 that are designed to be combined together in a modular fashion such that kit 90 may be used to form a plurality of different and selectively customizable repair parts, depending on the type of composite structure in need of repair, as well as on the extent and/or type of damage sustained by the composite structure. In this manner, composite laminates 36 of kits 90 may be formed such that the composite laminates 36 have more flexibility than would be typically suitable in the finished repair part, but also have a long shelf-life for storage, unlike partially cured or uncured materials, which may retain flexibility but generally are not suited for long-term storage. Disclosed kits 90 may thus be provided such that repair parts according to the present disclosure may be fabricated using composite laminates 36 of kit 90, with the potential for quicker fabrication of the repair parts than with conventional techniques.

Figure 13:
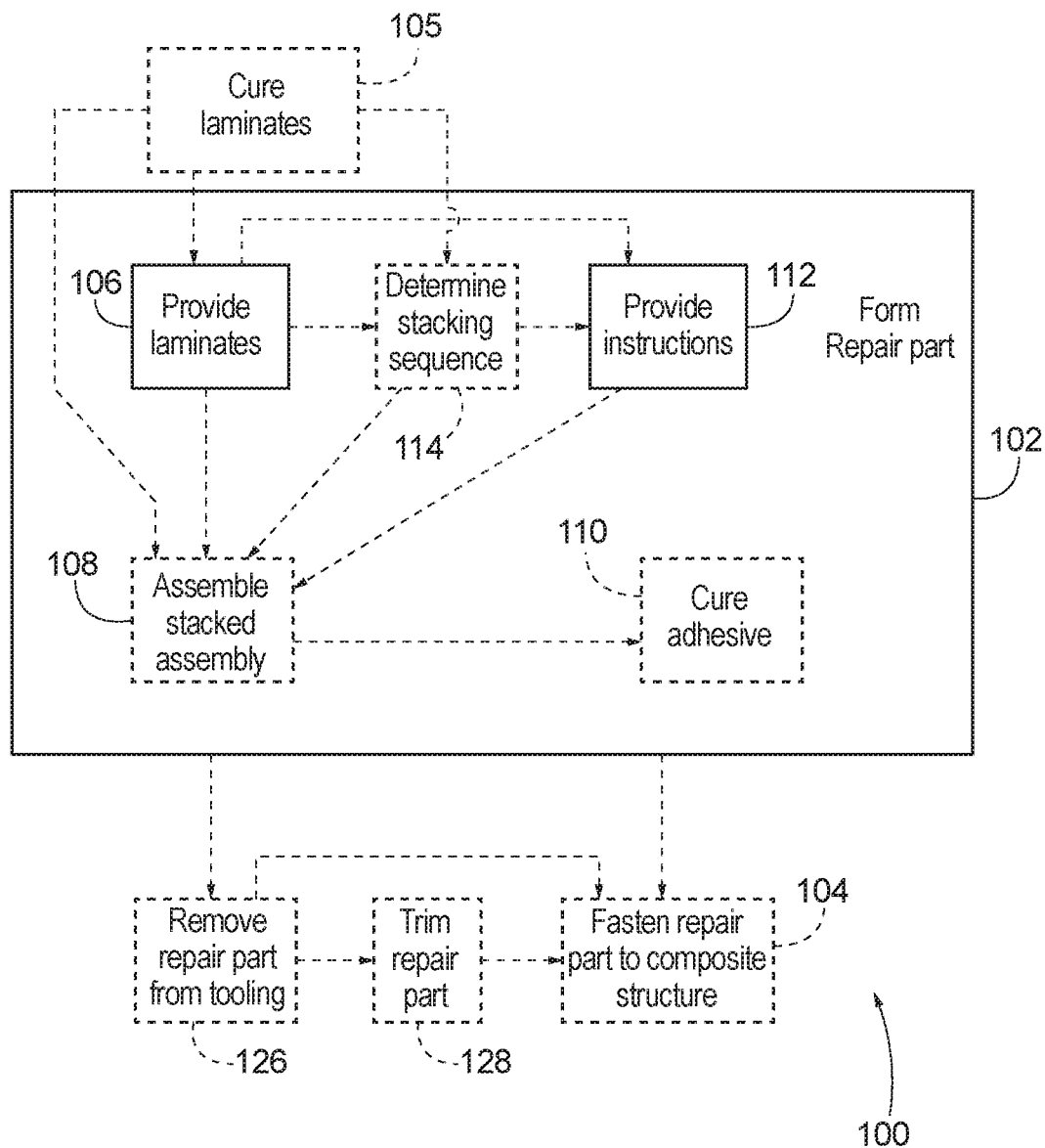
FIG. 13 is a schematic, flow-chart diagram of methods of repairing a damaged composite structure, according to the present disclosure.
Figure 14:
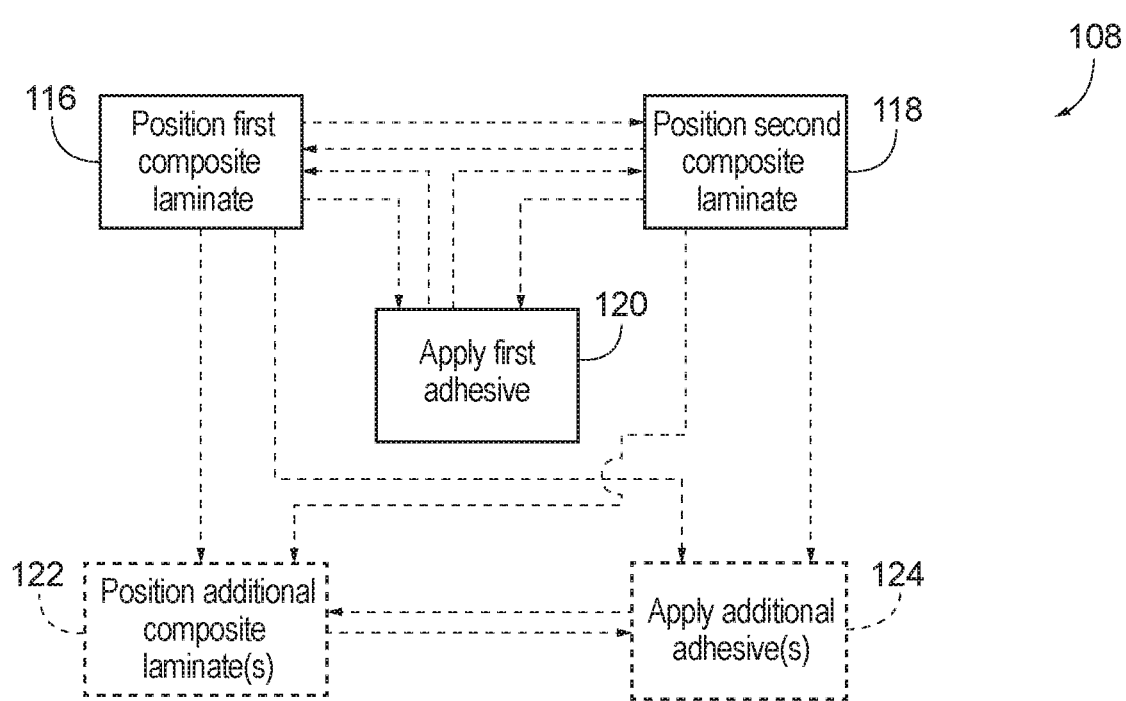
FIG. 14 is a schematic, flow-chart diagram of methods of assembling a stacked assembly for forming a repair part, according to the present disclosure.

Such laminates 36 and repair parts 50 as described herein in connection with FIGS. 2-5 and 7-11 may be made according to methods 100 according to the present disclosure. Methods 100 will be described with reference to flowcharts illustrated in FIGS. 13-14, as well as with reference to FIGS. 2-5 and 7-11. FIGS. 13-14 schematically provide flowcharts that represent illustrative, non-exclusive examples of methods according to the present disclosure. In FIGS. 13-14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 13-14 are not limiting and other methods and steps are within the scope of the present disclosure, including methods having greater than or fewer than the number of steps illustrated, as understood from the discussions herein.

FIG. 13 illustrates methods 100 of repairing damaged composite structures that may generally include forming a repair part (e.g., repair part 50) according to the present disclosure at 102, with said repair part being configured to be fastened, bonded, and/or otherwise secured to a damaged composite structure at 104. Forming the repair part at 102 generally includes forming and/or providing one or more composite laminates (e.g., composite laminate 36) at 105, 106, respectively. Forming and/or providing one or more composite laminates at 105, 106 may include forming (e.g., curing and/or molding or shaping) at least a first composite laminate and a second composite laminate at 105, where each of the first and second composite laminates has one or more respective laminae of fully cured fiber-reinforced composite material, with the first and second composite laminates each being selectively conformable to a desired radius of curvature. The number of laminae used in forming a given composite laminate may vary based on the application, or desired conformability. For example, for making a repair part for a damaged composite structure having tight radii or complex contours/curves, fewer laminae may be used in forming the composite laminates, to increase flexibility of the composite laminate in some examples. In some examples, the cured composite laminates may be selectively conformable to a radius of curvature of about 15 inches or less. For example, one, two, three, four, five, six, seven, or more laminae may be used to form each respective composite laminate. In other examples, composite laminates made for a larger radius of curvature may be made with a higher number of laminae, which may result in a less conformable composite laminate. Additionally or alternatively, the number of composite laminates may be selectively altered (e.g., increased or decreased), as desired for a given application.

The first and second composite laminates are configured to be assembled together, such as to form a stacked assembly (e.g., stacked assembly 42) at 108. FIG. 14 illustrates further substeps of forming the stacked assembly at 108, which will be discussed below. Adhesive between respective adjacent composite laminates may be cured, to form a repair part from the stacked assembly, at 110. For ease of discussion, methods 100 are discussed as assembling at least a first and second composite laminate together to form a stacked assembly and resulting repair part, though such methods may include assembling more than two composite laminates together, such as three, four, five, six, seven, or more composite laminates. FIG. 3 illustrates one example of a stacked assembly that includes five composite laminates, with a layer of adhesive positioned between each pair of adjacent composite laminates.

In some examples, forming the composite laminates at 105 may include forming and curing a plurality of first composite laminates and a plurality of second composite laminates, with the first composite laminates being different from the second composite laminates in one or more of shape, size, fiber orientation, and material composition. Providing the composite laminates at 106 may include storing one or more first composite laminates and/or one or more second composite laminates. For example, one or more composite laminates according to the present disclosure may be formed and cured, and then stored until needed to form a repair part. In this manner, the lead time for fabricating composite repair parts may be reduced, as the laminates may be configured to be ready to be stacked into stacked assemblies when needed. Such laminates also may advantageously have a longer shelf life than the raw (e.g., uncured) materials. Providing and/or storing the composite laminates at 106 may include forming a catalog of composite laminates that are configured to be assembled together in a plurality of different orientations and combinations to create a plurality of different and selectively customizable repair parts. Additionally or alternatively, providing the composite laminates at 106 may include shipping one or more composite laminates (e.g., one or more composite laminates of a first type and/or one or more composite laminates of a second type), and/or shipping one or more adhesives to use in assembling the composite laminates together. While methods 100 are generally described in the context of forming a repair part for the purposes of repairing a damaged composite structure, such methods 100 may be used to form composite parts in general, even if not configured to repair a damaged structure.

In some examples, such substeps of forming the repair part at 102 may be performed by different parties and/or may be separated from each other by significant amounts of time. For example, in some methods 100, the first and second composite laminates may be formed and/or provided at 106, and then stored for a period of time before being used to form a stacked assembly at 108 and curing the adhesive at 110 to bond the first and second (and any additional) composite laminates, thereby finishing forming the repair part at 102. Additionally or alternatively, a first party or manufacturer may perform the providing and/or forming the first and second composite laminates at 106, while a different party may perform the assembling the stacked assembly at 108. In some such methods, instructions may be provided, at 112, for assembling the first composite laminate together with the second composite laminate. For example, providing instructions at 112 may include instructions regarding the relative orientations (e.g., fiber directions) of the first and second composite laminates, what order to stack them in, etc. For example, providing instructions at 112 may include providing instructions to orient the first and second composite laminates in substantially similar orientations as one another, or to orient the laminates in different (or alternating or otherwise patterned, in examples with more than two composite laminates) orientations. In some examples, the first party that performs the forming and/or providing the composite laminates at 106 also may perform the providing instructions at 112, though this is not necessarily the case.

In some examples, providing instructions regarding forming a stacked assembly at 112 may include providing instructions regarding orienting the fiber directions of the composite laminates with respect to the resulting repair part (e.g., a longitudinal axis of the resulting repair part), and/or with respect to the damaged composite structure. The composite laminates may be configured to be stacked and/or arranged in a plurality of different sequences, and thus some methods 100 may include determining a suitable stacking sequence at 114, before providing instructions at 112. For example, a suitable and/or customized stacking sequence of composite laminates to produce a repair part having predetermined material properties for a given application may be determined at 114.

Providing instructions at 112 may include instructing the use of an adhesive (e.g., adhesive 44) between the first composite laminate and the second composite laminate, wherein the adhesive is configured to bond the first composite laminate to the second composite laminate when the adhesive is cured, thereby forming the repair part. In some methods 100, the adhesive is configured to be cured at 110 at a first temperature that is less than a second temperature at which the first composite laminate and the second composite laminate were cured at 105. For example, one or more respective laminae may be cured together to form the composite laminates at 105 at a temperature of at least 200° F. (93° C.), at least 250° F. (121° C.), at least 300° F. (149° C.), at least 325° F. (163° C.), and/or at least 350° F. (177° C.) in some examples. On the other hand, the adhesive between adjacent pairs of composite laminates may be cured at 110 by heating the adhesive (e.g., heating the stacked assembly) to any temperature that is sufficient to cure the adhesives and bond the composite laminates, such as at a temperature of less than 350 degrees Fahrenheit (350° F.; 177° C.), less than 300° F. (149° C.), less than 275° F. (135° C.), less than 250° F. (121° C.), less than 225° F. (107° C.), less than 200° F. (93° C.), less than 175° F. (79° C.), less than 150° F. (66° C.), and/or less than 125° F. (52° C.). In some methods 100, curing the adhesive at 110 includes curing the adhesive at a temperature that is sufficiently low so as not to affect the material properties of the composite laminates. In some methods 100, curing the adhesive at 110 includes curing the adhesive in an autoclave or pressure chamber, such as by placing the stacked assembly into the autoclave or pressure chamber. In some examples, the stacked assembly and tooling surface on which it is positioned may all be placed into the autoclave or pressure chamber. Additionally or alternatively, curing the adhesive at 110 may include compressing the stacked assembly within a vacuum environment, by reducing an air pressure within the vacuum environment to a reduced air pressure via a vacuum source, wherein the reduced air pressure is less than an ambient air pressure outside the vacuum environment. For example, curing the adhesive at 110 may include at least partially enveloping the stacked assembly within a polymeric membrane to create the vacuum environment and operatively coupling the vacuum source to the vacuum environment. In some examples, curing the adhesive at 110 may be performed while the stacked assembly is located remotely (e.g., away from) from the damaged composite structure, such that the damaged composite structure is not heated during the curing of the adhesive.

FIG. 14 schematically illustrates examples of methods of assembling the stacked assembly at 108. Generally, assembling the stacked assembly at 108 includes positioning a first composite laminate at 116 and positioning a second composite laminate with respect to the first composite laminate, at 118. For example, the first composite laminate may be positioned at 116 in a first orientation having a first fiber direction, such as in or on a tooling surface. An adhesive (e.g., a first adhesive) may be applied at 120, before and/or after positioning the laminates, and the second composite laminate may be positioned such that the adhesive is positioned between the first composite laminate and the second composite laminate. For example, referring to FIGS. 3 and 14, the adhesive may be applied at 120 (FIG. 14) to a first outer surface 96 (FIG. 3) of first composite laminate 36' and/or to a second inner surface 98 of second composite laminate 36", and laminates 36 may be stacked such that first outer surface 96 of first composite laminate 36' is facing and adjacent second inner surface 98 of second composite laminate 36", as shown in FIG. 3. For example, a layer of adhesive 44 is shown on a second outer surface 99 of second composite laminate 36' (second outer surface 99 being opposite second inner surface 98), with the first additional composite laminate 36''' being positioned such that the adhesive 44 is sandwiched between the first additional composite laminate 36''' and the second composite laminate 36". Adhesives 44 may be any suitable adhesives, including adhesive films, adhesive compounds, multi-part adhesives, epoxies, ultraviolet light curing adhesives, heat curing adhesives, moisture curing adhesives, hot adhesives, contact adhesives, pressure-sensitive adhesives, solvent-based adhesives, and/or polymer dispersion adhesives.

As shown in FIG. 14, one or more additional composite laminates may be positioned at 122, and one or more additional adhesives may be applied at 124, to form a stacked assembly having a plurality of composite laminates, with adhesives between each respective adjacent pair of composite laminates. For example, as shown in FIG. 3, three additional composite laminates 36''' and three additional adhesives 44 are illustrated having been positioned or applied on first and second composite laminates 36', 36". The laminates may be positioned at 116, 118, and/or 122 having any desired orientation (e.g., fiber direction). In some examples, each respective composite laminate may be oriented differently from each adjacent composite laminate. In some examples, the orientations of one or more composite laminates within a stacked assembly may be alternated. In some examples, the orientations of one or more composite laminates within a stacked assembly may be uniform.

Returning to FIG. 13, after the adhesives between the composite laminates has been cured, the resulting repair part may be removed from any curing environment and removed from the tooling or tooling surface at 126. Before coupling the repair part to the damaged composite structure at 104, the repair part may be trimmed to remove any excess material at 128, in some examples. Coupling the repair part to the damaged composite structure at 104 may include fastening the repair part to the damaged composite structure using one or more bolts or other fasteners, adhering or bonding the repair part to the damaged composite structure, and/or the stacked assembly may be cured directly onto the damaged composite structure in some examples. In some examples, the repair part may be bonded to the damaged composite structure concurrently with curing the adhesives to bond the composite laminates together. In some examples, the repair part may be bonded to the damaged composite structure after the curing the adhesive between the composite laminates at 110. In examples where the repair part is bonded to the damaged composite structure, one or more fasteners (e.g., bolts) additionally may be used to further secure the repair part to the damaged composite structure.

Illustrative, non-exclusive examples of inventive subject matter according to the present disclosure are described in the following enumerated paragraphs:

A1. A method, comprising:

forming a first composite laminate, wherein the first composite laminate comprises one or more first laminae of fully cured fiber-reinforced composite material, wherein the first composite laminate is flexible such that the first composite laminate is configured to be selectively conformable to a first radius of curvature; and forming a second composite laminate, wherein the second composite laminate comprises one or more second laminae of fully cured fiber-reinforced composite material, wherein the second composite laminate is flexible such that the second composite laminate is configured to be selectively conformable to a second radius of curvature, wherein the first composite laminate and the second composite laminate are configured to be assembled together to form a repair part configured to repair a damaged composite structure.

A1.1 The method of paragraph A1, wherein the first radius of curvature is about 15 inches or less.

A1.2. The method of paragraph A1 or A1.1, wherein the second radius of curvature is about 15 inches or less.

A1.3 The method of any of paragraphs A1-A1.2, further comprising providing instructions for assembling the first composite laminate together with the second composite laminate to form the repair part.

A2. The method of paragraph A1.3, wherein the providing instructions for assembling the first composite laminate together with the second composite laminate comprises providing instructions regarding the relative orientation of the first composite laminate with respect to the second composite laminate.

A3. The method of paragraph A2, wherein the providing the instructions regarding the relative orientation of the first composite laminate with respect to the second composite laminate comprises:

providing instructions to orient the first composite laminate in a first orientation having a first fiber direction with respect to a longitudinal axis of the repair part; and providing instructions to orient the second composite laminate in a second orientation having a second fiber direction with respect to the longitudinal axis of the repair part.

A3.1. The method of paragraph A3, wherein the first fiber direction and the second fiber direction are different.

A3.2. The method of any of paragraphs A2-A3.1, wherein the providing the instructions regarding the relative orientation of the first composite laminate with respect to the second composite laminate comprises:

providing instructions to orient the first composite laminate in a first orientation having a first fiber direction with respect to the damaged composite structure; and providing instructions to orient the second composite laminate in a second orientation having a second fiber direction with respect to the damaged composite structure, wherein the first fiber direction and the second fiber direction are different.

A3.3. The method of any of paragraphs A1.3-A3.2, wherein the providing instructions for assembling the first composite laminate together with the second composite laminate comprises instructing the use of an adhesive between the first composite laminate and the second composite laminate, wherein the adhesive is configured to bond the first composite laminate to the second composite laminate when the adhesive is cured, thereby forming the repair part, and wherein the adhesive is configured to be cured at a first temperature that is less than a second temperature at which the first composite laminate and the second composite laminate were cured.

A4. The method of any of paragraphs A1-A3.3, wherein the forming the first composite laminate comprises curing at least two first laminae together to form the first composite laminate.

A4.1. The method of paragraph A4, wherein the curing the at least two first laminae together to form the first composite laminate comprises curing the at least two first laminae together at a temperature of at least 250° F. (121° C.), at least 300° F. (149° C.), at least 325° F. (163° C.), and/or at least 350° F. (177° C.).

A5. The method of any of paragraphs A1-A4.1, wherein the forming the first composite laminate comprises curing seven or fewer first laminae together to form the first composite laminate.

A5.1. The method of paragraph A5, wherein the curing the seven or fewer first laminae together to form the first composite laminate comprises curing the seven or fewer first laminae together at a temperature of at least 250° F. (121° C.), at least 300° F. (149° C.), at least 325° F. (163° C.), and/or at least 350° F. (177° C.).

A6. The method of any of paragraphs A1-A5.1, wherein the forming the second composite laminate comprises curing at least two second laminae together to form the second composite laminate.

A6.1. The method of paragraph A6, wherein the curing the at least two second laminae together to form the second composite laminate comprises curing the at least two second laminae together at a temperature of at least 250° F. (121° C.), at least 300° F. (149° C.), at least 325° F. (163° C.), and/or at least 350° F. (177° C.).

A7. The method of any of paragraphs A1-A6.1, wherein the forming the second composite laminate comprises curing seven or fewer second laminae together to form the second composite laminate.

A7.1. The method of paragraph A7, wherein the curing the seven or fewer second laminae together to form the second composite laminate comprises curing the seven or fewer second laminae together at a temperature of at least 250° F. (121° C.), at least 300° F. (149° C.), at least 325° F. (163° C.), and/or at least 350° F. (177° C.).

A8. The method of any of paragraphs A1-A7.1, wherein the one or more first laminae and the one or more second laminae comprise a carbon fiber reinforced polymer.

A9. The method of any of paragraphs A1-A8, further comprising:

forming one or more additional composite laminates, wherein each respective composite laminate of the one or more additional composite laminates comprises one or more additional laminae of fully cured fiber-reinforced composite material, and wherein each of the one or more additional composite laminates is flexible such that it is configured to be selectively conformable to a radius of curvature of about 15 inches or less, wherein the one or more additional composite laminates are configured to be assembled together with the first composite laminate and the second composite laminate to form the repair part.

A10. The method of paragraph A9, further comprising providing instructions for assembling the one or more additional composite laminates together with the first composite laminate and the second composite laminate, to form the repair part configured to repair the damaged composite structure.

A10.1. The method of paragraph A10, wherein the providing instructions comprises providing instructions to position an additional respective adhesive positioned between each respective adjacent pair of composite laminates.

A11. The method of any of paragraphs A1-A10.1, wherein the first composite laminate, the second composite laminate, and/or a/the one or more additional composite laminates are shaped complementarily to each other such that they are configured to be stacked and nested together to form the repair part.

A11.1. The method of any of paragraphs A10-A11, wherein the providing instructions comprises providing instructions to stack the composite laminates such that respective adjacent composite laminates alternate between being oriented in a first orientation and being oriented in a second orientation such that the first composite laminate is oriented in the first orientation, the second composite laminate is oriented in the second orientation, and at least one of the one or more additional composite laminates is oriented in the first orientation, wherein the first orientation is different from the second orientation.

A12. The method of any of paragraphs A1-A11.1, wherein the forming the first composite laminate comprises forming a plurality of first composite laminates, and wherein the forming the second composite laminate comprises forming a plurality of second composite laminates, wherein the plurality of first composite laminates are different from the plurality of second composite laminates in one or more of shape, size, fiber orientation, and material composition.

A13. The method of paragraph A12, further comprising storing the plurality of first composite laminates and the plurality of second composite laminates for later use.

A14. The method of any of paragraphs A1-A13, wherein the forming the first composite laminate comprises forming a plurality of first composite laminates, wherein at least some respective first composite laminates of the plurality of first composite laminates are different in size, shape, fiber orientation, and/or material composition from other respective first composite laminates of the plurality of first composite laminates.

A15. The method of paragraph A14, wherein different respective first composite laminates of the plurality of first composite laminates are configured to be stacked together in a plurality of different sequences.

A16. The method of paragraph A14 or A15, further comprising selecting a first respective first composite laminate and a second respective first composite laminate from among the plurality of first composite laminates, wherein the first respective composite laminate and the second respective composite laminate are selected to form a respective repair part having predetermined material properties for a given application.

A17. The method of any of paragraphs A4-A16, further comprising forming a catalog of first composite laminates that are configured to be assembled together in a plurality of different orientations and combinations to create a plurality of different repair parts, wherein the plurality of different repair parts are selectively customizable.

A18. The method of any of paragraphs A1-A17, wherein the first composite laminate and the second composite laminate are configured to be assembled together to form an aerospace component configured to repair a damaged aircraft.

B1. A method, comprising:
positioning a first composite laminate in a first orientation having a first fiber direction in or on a tooling, wherein the first composite laminate comprises one or more first laminae of fully cured fiber-reinforced composite material;
applying a first adhesive to a first outer surface of the first composite laminate or to a second inner surface of a second composite laminate;
positioning the second composite laminate with respect to the first composite laminate such that the first adhesive is positioned between the second inner surface of the second composite laminate and the first outer surface of the first composite laminate, thereby forming a stacked assembly, wherein the second composite laminate comprises one or more second laminae of fully cured fiber-reinforced composite material; and
curing the first adhesive, thereby bonding the first composite laminate and the second composite laminate together and forming a resulting part.

B1.1. The method of paragraph B1, wherein the resulting part is a repair part configured to repair a damaged composite structure.

B2. The method of paragraph B1 or B1.1, further comprising:
applying a second adhesive to a second outer surface of the second composite laminate, the second outer surface being opposite the second inner surface of the second composite laminate; and adding a third composite laminate to the stacked assembly, wherein the third composite laminate is positioned with respect to the second composite laminate such that the second adhesive is positioned between a third inner surface of the third composite laminate and the second outer surface of the second composite laminate, wherein the curing the first adhesive comprises curing the first adhesive and the second adhesive, and wherein the curing the first adhesive and the second adhesive thereby bonds the first composite laminate, the second composite laminate, and the third composite laminate together to form the resulting part.

B3. The method of paragraph B2, further comprising applying one or more additional adhesives and adding one or more respective additional composite laminates to the stacked assembly such that the stacked assembly comprises alternating layers of adhesives and composite laminates, wherein the curing the first adhesive and the second adhesive comprises curing the first adhesive and the second adhesive together with the one or more additional adhesives, thereby bonding the first composite laminate, the second composite laminate, and the third composite laminate together with the one or more respective additional composite laminates to form the resulting part.

B4. The method of any of paragraphs B1-B3, wherein the first adhesive comprises a first adhesive film.

B5. The method of any of paragraphs B1-B4, wherein the second adhesive comprises a second adhesive film.

B6. The method of any of paragraphs B3-B5, wherein, when depending from B3, the one or more additional adhesives comprise one or more additional respective adhesive films.

B7. The method of any of paragraphs B1-B6, wherein the positioning the second composite laminate comprises positioning the second composite laminate in a second orientation having a second fiber direction, the second fiber direction being different from the first fiber direction.

B8. The method of paragraph B7, wherein the second orientation is different from the first orientation.

B9. The method of any of paragraphs B2-B8, wherein, when depending from B2, the positioning the third composite laminate comprises positioning the third composite laminate in a third orientation having a third fiber direction.

B10. The method of paragraph B9, wherein the third fiber direction is substantially the same as the first fiber direction and/or the second fiber direction.

B11. The method of paragraph B9 or B10, wherein the third fiber direction is different from the first fiber direction and/or the second fiber direction.

B12. The method of any of paragraphs B1-B11, wherein the curing the first adhesive comprises curing the first adhesive at a first temperature that is less than a second temperature at which the first composite laminate and/or the second composite laminate are configured to be cured at.

B13. The method of any of paragraphs B1-B12, wherein the curing the first adhesive comprises curing the first adhesive at a/the first temperature that is sufficiently low so as not to affect the material properties of the first composite laminate and the second composite laminate.

B14. The method of any of paragraphs B1-B13, wherein the curing the first adhesive comprises curing the first adhesive at a/the first temperature that is less than 350 degrees Fahrenheit (350° F.; 177° C.), less than 300° F. (149° C.), less than 275° F. (135° C.), less than 250° F. (121° C.), less than 225° F. (107° C.), less than 200° F. (93° C.), less than 175° F. (79° C.), less than 150° F. (66° C.), and/or less than 125° F. (52° C.).

B14.1. The method of any of paragraphs B1-B14, wherein the curing the first adhesive comprises curing the first adhesive at a/the first temperature that is sufficient to cure the first adhesive and bond the first composite laminate to the second composite laminate.

B15. The method of any of paragraphs B1-B14.1, wherein the curing the first adhesive comprises curing the first adhesive in an autoclave.

B15.1. The method of any of paragraphs B1-B15, wherein the curing the first adhesive comprises compressing the stacked assembly within a vacuum environment, by reducing an air pressure within the vacuum environment to a reduced air pressure via a vacuum source, wherein the reduced air pressure is less than an ambient air pressure outside the vacuum environment.

B15.2. The method of any of paragraphs B1-B15.1, wherein the curing the first adhesive comprises at least partially enveloping the stacked assembly within a polymeric membrane to create a/the vacuum environment, wherein the vacuum environment is operatively coupled to a/the vacuum source, and wherein the method further comprises reducing an/the air pressure within the vacuum environment to a/the reduced air pressure, wherein the reduced air pressure is less than an/the ambient air pressure outside the vacuum environment.

B16. The method of any of paragraphs B1-B15.2, wherein the curing the first adhesive comprises heating the stacked assembly.

B17. The method of any of paragraphs B1-B16, wherein the curing the first adhesive comprises applying a heating blanket to the stacked assembly.

B18. The method of any of paragraphs B1-B17, further comprising removing the resulting part from the tooling.

B19. The method of any of paragraphs B1-B18, further comprising coupling the resulting part to a/the damaged composite structure, thereby repairing the damaged composite structure.

B19.1. The method of paragraph B19, wherein the coupling the resulting part to the damaged composite structure comprises bolting the resulting part to the damaged composite structure.

B19.2. The method of paragraph B19 or B19.1, wherein the coupling the resulting part to a/the damaged composite structure comprises coupling a plurality of resulting parts to the damaged composite structure.

B19.3. The method of paragraph B19.2, wherein the coupling the plurality of resulting parts to the damaged composite structure comprises coupling the plurality of resulting parts such that at least a first portion of a first respective resulting part of the plurality of resulting parts overlaps at least a second portion of a second respective resulting part of the plurality of resulting parts.

B19.4. The method of any of paragraphs B19-B19.3, further comprising removing a damaged portion of the damaged composite structure.

B19.5. The method of paragraph B19.4, wherein the removing the damaged portion of the damaged composite structure is performed prior to the coupling the resulting part to the damaged composite structure.

B19.6. The method of any of paragraphs B1-B19.5, wherein a first contour of the resulting part is substantially the same as a second contour of a/the damaged composite structure.

B19.7. The method of any of paragraphs B1-B19.6, wherein a third contour of the resulting part is different from a fourth contour of a/the damaged composite structure.

B20. The method of any of paragraphs B1-B19.6, further comprising positioning a release film between the tooling and the stacked assembly before the positioning the first composite laminate in or on the tooling, wherein the release film is configured to prevent or reduce adhesion of the stacked assembly to the tooling.

B21. The method of any of paragraphs B1-B20, wherein the curing the first adhesive comprises heating the tooling together with the stacked assembly.

B22. The method of any of paragraphs B1-B21, wherein the curing the first adhesive comprises curing the first adhesive while the stacked assembly is located remotely from a/the damaged composite structure, such that the damaged composite structure is not heated during the curing the first adhesive.

B23. The method of any of paragraphs B1-B22, further comprising trimming one or more edges of the resulting part after the curing the first adhesive.

B24. The method of any of paragraphs B1-B23, further comprising trimming one or more edges of the stacked assembly before the curing the first adhesive.

B25. The method of any of paragraphs B1-B24, wherein the curing the first adhesive, thereby forming the resulting part, comprises forming a resulting part configured to repair a structural feature of a/the damaged composite structure.

C1. A method, comprising providing instructions to perform the method of any of paragraphs B1-1325.

C2. The method of paragraph C1, further comprising determining a customized sequence of one or more first composite laminates and one or more second composite laminates for forming the stacked assembly.

D1. A method, comprising repairing an aircraft by performing the method of any of paragraphs A1-A18, and/or any of paragraphs B1-B25.

E1. An aircraft comprising a repair part formed by performing the method of any of paragraphs A1-A18, and/or any of paragraphs B1-B25.

F1. A repair part, wherein the repair part is formed by performing the method of any of paragraphs A1-A18, and/or any of paragraphs B1-1325, wherein the repair part is configured to repair a damaged composite structure.

F2. The repair part of paragraph F1, wherein the repair part comprises at least a portion of a stringer for an aircraft.

F2.1. The repair part of paragraph F1 or F2, wherein the repair part comprises at least a portion of a stiffener for an aircraft.

F3. The repair part of any of paragraphs F1-F2, wherein the repair part comprises a first material, and wherein the damaged composite structure also comprises the first material.

F4. The repair part of any of paragraphs F1-F3, wherein the repair part is configured to be bolted to the damaged composite structure such that the repair part spans a damaged portion of the damaged composite structure.

F5. The repair part of any of paragraphs F1-F4, wherein the repair part conforms to the damaged composite structure.

F6. The repair part of any of paragraphs F1-F5, wherein the repair part is customized to repair a/the damaged portion of the damaged composite structure.

F7. The repair part of any of paragraphs F1-F6, wherein the repair part is configured to repair one or more of a skin panel of an aircraft, an aircraft frame, a shear tie, and an aircraft fuselage.

F8. The repair part of any of paragraphs F1-F7, wherein the repair part comprises a splice for a damaged barrel segment, a frame splice part, a stiffener splice, and/or a splice between a repair panel and an aircraft's original fuselage skin.

F9. The repair part of any of paragraphs F1-F8, wherein the repair part is three-dimensionally contoured such that it is complementarily shaped to the damaged composite structure which it is configured to repair.

F10. The repair part of any of paragraphs F1-F9, wherein the repair part comprises an angled repair part, wherein the angled repair part comprises a first portion arranged at an angle to a second portion.

F11. The repair part of paragraph F10, wherein the angled repair part is configured to conform to a portion of the damaged composite structure.

F12. The repair part of paragraph F10 or F11, wherein the angled repair part is a first angled repair part, and wherein the first angled repair part is configured to be assembled together with a second angled repair part, a third angled repair part, and/or a fourth angled repair part to repair the damaged composite structure.

F13. The repair part of any of paragraphs F10-F12, wherein one or more angled repair parts are configured to be selectively combined together in any of a plurality of different arrangements to repair the damaged composite structure.

F14. A system, comprising:
the repair part of any of paragraphs F1-F13.

F15. A system, comprising:
a plurality of composite laminates configured to be assembled together to form a stacked assembly, wherein each respective composite laminate comprises at least one respective lamina of fully cured fiber-reinforced composite material, wherein each respective composite laminate is configured to be selectively conformable to a first radius of curvature; and one or more adhesives, wherein each respective adhesive of the one or more adhesives is configured to be positioned between a respective pair of adjacent composite laminates of the stacked assembly, and wherein the one or more adhesives are configured to bond the respective composite laminates of the stacked assembly together to form a repair part configured to repair a damaged composite structure.

F16. The system of any of paragraphs F14-F15, further comprising a release film and a tooling surface, wherein the release film is configured to be positioned between the tooling surface and a/the stacked assembly, wherein the tooling surface defines a desired contour for the resulting repair part, and wherein the stacked assembly is configured to be positioned on the tooling surface while a/the one or more adhesives are cured, thereby forming the repair part.

F17. The system of any of paragraphs F14-F16, further comprising one or more fasteners configured for securing the repair part to a/the damaged composite structure.

G1. A kit, comprising:
a plurality of composite laminates, wherein each respective composite laminate comprises one or more respective laminae of fully cured fiber-reinforced composite material, wherein each respective composite laminate is at least semi-flexible, and wherein at least some of the plurality of composite laminates are different from at least some others of the plurality of composite laminates in shape, size, fiber direction, and/or material composition, and wherein the plurality of composite laminates comprises a first respective composite laminate and a second respective composite laminate, wherein the first composite laminate and the second composite laminate are configured to be assembled together to form a repair part configured to repair a damaged composite structure.

G2. The kit of paragraph G1, wherein each respective composite laminate of the plurality of composite laminates comprises at least two respective laminae of fully cured fiber-reinforced composite material, at least three respective laminae of fully cured fiber-reinforced composite material, at least four respective laminae of fully cured fiber-reinforced composite material, at least five respective laminae of fully cured fiber-reinforced composite material, at least six respective laminae of cured composite material, and/or at least seven respective laminae of cured composite material.

G3. The kit of any of paragraphs G1-G2, wherein each respective lamina of a given respective composite laminate is oriented substantially identically to the other respective laminae of the given respective composite laminate.

G4. The kit of any of paragraphs G1-G2, wherein at least one respective lamina of a given respective composite laminate has a different orientation from at least one different respective lamina of the given respective composite laminate.

G5. The kit of any of paragraphs G1-G4, wherein the kit is configured to be used to form the repair part of any of paragraphs F1-F13.

G6. The kit of any of paragraphs G1-G5, wherein the kit is configured to be used to form a plurality of different and selectively customizable repair parts.

H1. A method, comprising selling the kit of any of paragraphs G1-G6.

I1. Use of the repair part of any of paragraphs F1-F13 or the system of any of paragraphs F14-F17 to repair a damaged composite structure.

I2. Use of the repair part of any of paragraphs F1-F13 or the system of any of paragraphs F14-F17 to repair an aircraft.

J1. Use of the kit of any of paragraphs G1-G6 to repair a damaged composite structure.

J2. Use of the kit of any of paragraphs G1-G6 to repair an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method, comprising:
shaping and curing a plurality of composite laminates until each respective composite laminate is fully cured and has a respective three-dimensional shape such that each respective composite laminate has at least a respective first portion and a respective second portion arranged at a non-parallel angle with one another, wherein each respective composite laminate comprises one or more respective laminae of fiber-reinforced composite material, wherein each respective composite laminate is configured to be selectively conformable to a respective predetermined radius of curvature, and wherein the shaping and curing the plurality of composite laminates comprises curing each composite laminate at or above a first temperature;

forming an inventory comprising the plurality of composite laminates, wherein the inventory is configured such that one or more of the composite laminates of the inventory are configured to be assembled together with one or more other of the composite laminates of the inventory in a plurality of different orientations and combinations to create a plurality of different possible repair parts; and determining a customized sequence of two or more of the composite laminates from the inventory to be assembled together in a stacked assembly to form a particular repair part, wherein the particular repair part is configured to repair a particular damaged composite structure, and wherein the customized sequence is selected based on a respective size, thickness, shape, and/or fiber orientation of the respective composite laminate to create the particular repair part that meets predetermined criteria for repairing the particular damaged composite structure.

2. The method according to claim 1, further comprising:
assembling the customized sequence of composite laminates together to form the stacked assembly according to the customized sequence, thereby forming the particular repair part.

3. The method according to claim 2, wherein the assembling the customized sequence of composite laminates together comprises:
applying an adhesive between each pair of adjacent composite laminates of the stacked assembly, wherein the adhesive is configured to bond the stacked assembly together when the adhesive is cured, wherein the adhesive is configured to be cured at or below a second temperature that is less than the first temperature; and
curing the adhesive at or below the second temperature, after the customized sequence of composite laminates are assembled together using the adhesive.

4. The method according to claim 3, wherein the curing the adhesive comprises curing the adhesive while the stacked assembly is positioned apart from the particular damaged composite structure.

5. The method according to claim 4, wherein the curing the adhesive comprises curing the stacked assembly in an autoclave.

6. The method according to claim 3, further comprising fastening the particular repair part to the particular damaged composite structure via one or more fasteners, such that the particular repair part spans a damaged portion of the particular damaged composite structure, thereby repairing the particular damaged composite structure.

7. The method according to claim 6, wherein the assembling the customized sequence of composite laminates together to form the particular repair part comprises assembling a plurality of customized sequences of composite laminates together to form a plurality of particular repair parts, and wherein the fastening the particular repair part comprises fastening the plurality of particular repair parts to the particular damaged composite structure such that at least one area of overlap is formed between a first respective repair part of the plurality of particular repair parts and a second respective repair part of the plurality of particular repair parts.

8. The method according to claim 6, wherein the one or more fasteners comprise one or more bolts.

9. The method according to claim 3, further comprising positioning the particular repair part on the particular damaged composite structure during the curing the adhesive, such that the particular damaged composite structure serves as a tooling surface for the particular repair part as the adhesive is cured.

10. The method according to claim 1, wherein the determining the customized sequence of two or more of the composite laminates from the inventory to be assembled together in the stacked assembly further comprises determining a respective orientation for each respective composite laminate in the customized sequence.

11. The method according to claim 10, wherein the determining the respective orientation for each respective composite laminate in the customized sequence comprises determining each respective orientation relative to a longitudinal axis of the particular repair part.

12. The method according to claim 1, wherein each respective composite laminate of the inventory comprises less than seven laminae of fiber-reinforced composite material.

13. The method according to claim 1, wherein the customized sequence comprises a sequence that alternates between a first orientation and a second orientation such that a first composite laminate of the sequence is oriented in the first orientation, a second composite laminate of the sequence is oriented in the second orientation, and at least one additional composite laminate of the sequence is oriented in the first orientation, wherein the first orientation is different from the second orientation.

14. The method according to claim 1, wherein at least some respective composite laminates of the inventory are different in one or more of size, shape, fiber orientation, number of laminae, and material composition from at least some other composite laminates of the inventory.

15. The method according to claim 1, further comprising:
removing a damaged portion of the particular damaged composite structure; and
fastening the particular repair part to the particular damaged composite structure after the damaged portion is removed from the particular damaged composite structure.

16. A method, comprising:
assembling a first composite laminate together with a second composite laminate to form a particular repair part configured to repair a particular damaged composite structure, wherein the first composite laminate comprises one or more first laminae of fully cured fiber-reinforced composite material, wherein the first composite laminate is flexible such that the first composite laminate is configured to be selectively conformable to a first radius of curvature, and wherein the first composite laminate is pre-shaped to have at least a first portion and a second portion arranged at a first non-parallel angle with one another, wherein the second composite laminate comprises one or more second laminae of fully cured fiber-reinforced composite material, wherein the second composite laminate is flexible such that the second composite laminate is configured to be selectively conformable to a second radius of curvature, wherein the second composite laminate is pre-shaped to have at least a third portion and a fourth portion arranged at a second non-parallel angle with one another, and wherein the first radius of curvature and the second radius of curvature are predetermined based on the particular damaged composite structure;

applying an adhesive between the first composite laminate and the second composite laminate, wherein the adhesive is configured to bond the first composite laminate to the second composite laminate when the adhesive is cured, thereby forming the particular repair part, and wherein the adhesive is configured to be cured at a first temperature that is less than a second temperature at which the first composite laminate and the second composite laminate were cured;

curing the adhesive at or below the first temperature, after the first composite laminate is assembled together with the second composite laminate using the adhesive; and fastening the particular repair part to the particular damaged composite structure via one or more bolts, wherein the curing the adhesive is performed before the fastening the particular repair part to the particular damaged composite structure.

17. The method according to claim 16, wherein the first temperature is at least 300° F. (149° C.), and wherein the second temperature is less than 275° F. (135° C.).

* * * * *